United States Patent [19]
Ichikawa et al.

[11] Patent Number: 4,841,367
[45] Date of Patent: Jun. 20, 1989

[54] VIDEO SOURCE SELECTING SYSTEM

[75] Inventors: Norihito Ichikawa; Ikeo Someya; Osamu Oda, all of Tokyo; Toshio Amano, Kanagawa, all of Japan

[73] Assignee: Sony Corporation, Tokyo, Japan

[21] Appl. No.: 79,153

[22] Filed: Jul. 29, 1987

[30] Foreign Application Priority Data

Jul. 29, 1986 [JP] Japan .................................. 61-178172

[51] Int. Cl.⁴ ........................................... H04N 5/268
[52] U.S. Cl. .................................................. 358/181
[58] Field of Search ..................... 358/181, 93, 86, 188

[56] References Cited

U.S. PATENT DOCUMENTS 4,424,591  1/1984  Boardman ............................ 358/181
4,631,854  11/1982  Wolfe .................................... 358/181

FOREIGN PATENT DOCUMENTS 23679  2/1984  Japan .................................. 358/181

*Primary Examiner*—Tommy P. Chin

[57] ABSTRACT

A video source selecting system for a television receiver has a built-in video tape recorder (video deck) for sequentially selecting for display, a plurality of video signals on various channels, such video signals including at least a video signal from the built-in video deck, and a video signal from at least one external video input terminal. A selected video signal is supplied to a monitor television receiver. When the built-in video tape recorder is placed in its playback mode, the plurality of video signals are switched selected sequentially, while when the built-in video tape recorder is not placed in its playback mode, it is skipped by the switch, whereby the order in which the video signals are switched is in response to the operational state of the built-in video tape recorder.

8 Claims, 2 Drawing Sheets

VIDEO SOURCE SELECTING SYSTEM

FIELD OF THE INVENTION

The present invention relates generally to a video source selecting system and, more particularly, to a video source selecting system for use with a television receiver in which a video tape recorder (video deck) is incorporated. Background of the Present Invention A known television receiver incorporating a video tape recorder is so arranged as to integrally incorporate a video tape recorder section into the housing of a television receiver section. With this type of television receiver, a television broadcast received at the tuner of the television receiver section can be recorded on the tape of a video tape cassette loaded into the video tape recorder section, and video signals reproduced from a video tape loaded onto the video tape recorder section can be reproduced by the television receiver section, for example, as described in unpublished Japanese Patent Application No. 61-1877.

If the functions of recording and reproducing the video information are combined with the functions of the television receiver, to receive and reproduce the television broadcast signals, this combination of functions makes the circuit components, such as a tuner and the like, commonly unable, thus simplifying the overall arrangement of the combination.

This kind of television receiver incorporating a built-in video tape recorder is provided with a selecting switch circuit for selecting a video signal of a television broadcast signal supplied from the tuner, or a video signal reproduced from a video tape in the video tape recorder, for display.

However, since the switching operation of the switching circuit is carried out regardless of the presence or absence of a video signal reproduced from the video tape recorder, this previously proposed type of television receiver has disadvantages. Specifically, double operations must be carried out, that is, the video tape recorder must be placed in the playback mode, using one control unit, and also the above mentioned switching circuit, as a second control unit, must be switched to the video tape recorder side, in order to display the reproduced signal. On the contrary, when the television broadcast is received and intended to be displayed by the CRT, the video tape recorder must be placed in the stop mode using a first control and the switching circuit, as a second control, must be switched to the television broadcasting receiving side. Further, this type of television receiver is provided with an external video signal input terminal which is supplied with a different video signal from an external video tape recorder or the like. When such video signal from the external video input terminal is to be selected by this switching circuit, the operation of this television receiver is more complicated.

OBJECTIONS AND SUMMARY OF THE INVENTION

Accordingly it is an object of this invention to provide an improved video source selecting system.

It is another object of this invention to provide a video source selecting system for use with a television receiver incorporating a built-in video tape recorder, wherein the video signals are satisfactorily switched in response to the operational state of the built-in video tape recorder, so that the television receiver becomes easy to control.

According to one aspect of the present invention, there is provided a video source selecting system comprising:

(a) switching means for sequentially selecting one of a plurality of video signals, including a video signal from a built-in video tape recorder and a video signal from at least one external video input terminal, and for supplying the same to a monitor television receiver; and (b) control means for controlling said switching means in such a manner that when said built-in video tape recorder is placed in the playback mode, all of the said plurality of video signals are sequentially selected, by successive operations of said switching means, while when said built-in video tape recorder is not placed in the playback mode, its signal is skipped by the switching means.

These and other objects, features and advantages of the present invention will become apparent from the following detailed description of the preferred embodiment that is to be read in conjunction with the accompanying drawings, in which like reference numerals identify like elements and parts.

DESCRIPTION OF THE PREFERRED EMBODIMENT

Now, an embodiment of a video source selecting system according to the present invention will hereinafter be described with reference to the attached drawings.

Figure 1:
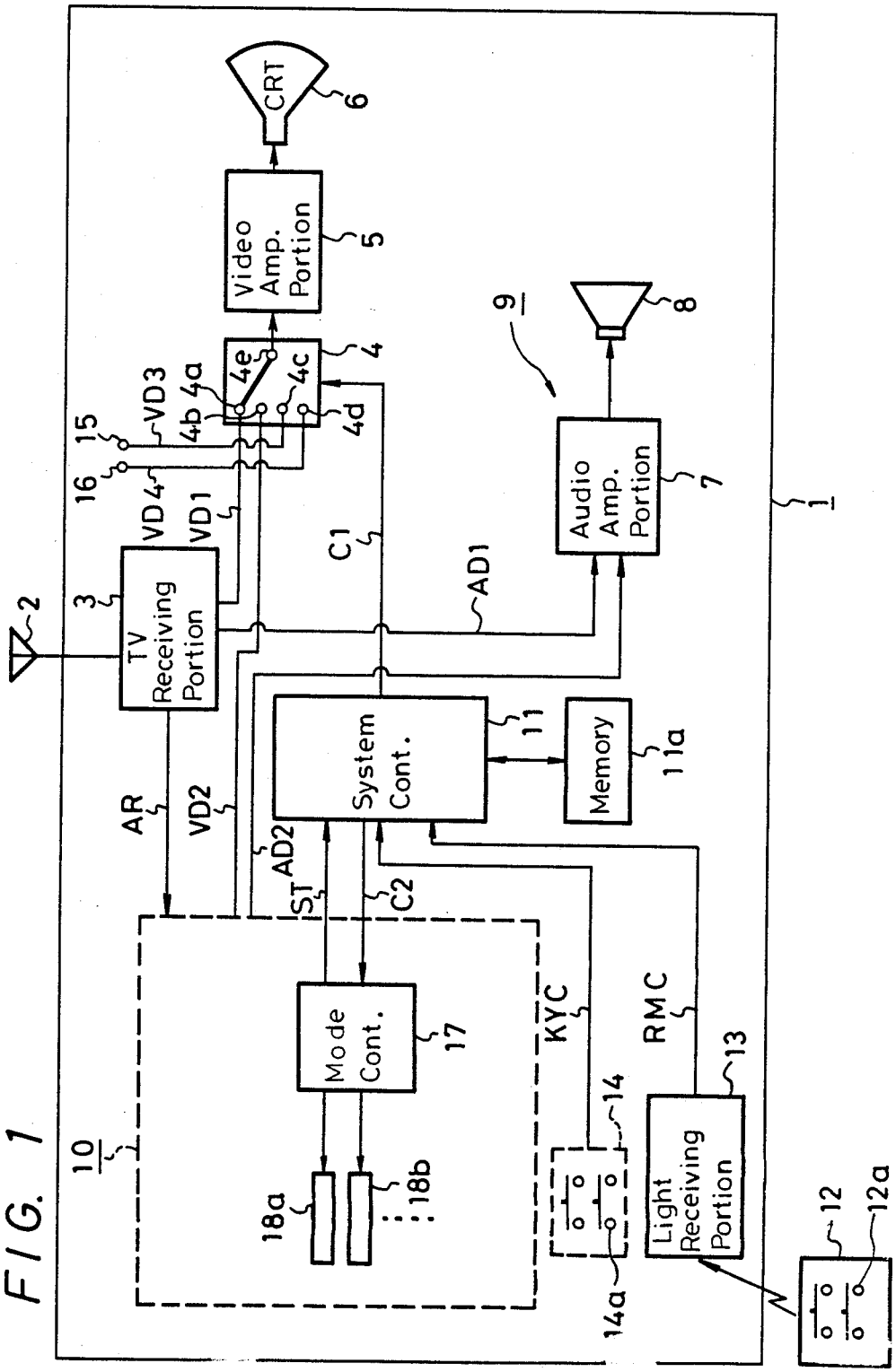
FIG. 1 is a block diagram of a television receiver to which is applied an embodiment of a video source selecting system according present invention.

FIG. 1 illustrates an overall arrangement of a built-in video tape recorder type television receiver, which includes a video source selecting system of this embodiment.

Referring to FIG. 1, a built-in video tape recorder type television receiver 1 incorporates a video tape recorder (video deck) section 10. The video tape recorder section 10 is what may be called 8 mm video tape recorder and employs a video tape cassette using a video tape of, for example, 8 mm wide. The arrangement of this television receiver 1 will be described hereinafter.

In this television receiver 1, a television broadcast signal received at an antenna 2 is received by a tuner or television broadcasting receiving portion 3. Then, a video detected output VD1 from the television broadcasting receiving portion 3 is supplied through a switching circuit 4, which will be described later, and through a video amplifying portion 5 to a CRT (cathode ray tube) 6 forming a picture display portion to be thereby displayed. An audio detected output signal AD1 from the television broadcasting receiving portion 3 is supplied through an audio amplifying portion 7 to a loudspeaker 8, from which a sound is emanated. These components make up the television receiver section 9.

The switching circuit 4 includes first, second, third and fourth fixed contacts 4a, 4b, 4c and 4d and a movable contact 4e. The switching circuit 4, namely, its movable contact 4e is controlled by a system control portion 11 which will be described later. The above mentioned video detected output VD1 is supplied to the first fixed contact 4a of the switching circuit 4 and the movable contact 4e of the switching circuit 4 is connected to the video amplifying portion 5. With this circuit arrangement, when the movable contact 4e is connected to the first fixed contact 4a, the reception of the television broadcast signal becomes possible as described above.

The second fixed contact 4b of the switching circuit 4 is connected to the video tape recorder section 10 incorporated in the television receiver 1. The video tape recorder section 10 is supplied with a video signal AR of a television broadcast program signal received at the television broadcasting reception portion 3. The video signal AR applied to the video tape recorder section 10 is recorded on a video tape cassette (not shown) loaded into the video tape recorder section 10. A video output signal VD2 reproduced from the video cassette tape of the video tape recorder section 10 is supplied to the second fixed contact 4b of the switching circuit 4. When the movable contact 4e of the switching circuit 4 is connected to its second fixed contact 4b, the reproduced video output signal VD2 is supplied to the video amplifying portion 5 and then the reproduced video output signal VD2 is displayed on the CRT 6. At the same time when the reproduced video output signal VD2 is delivered from the video tape recorder section 10, the reproduced audio output signal AD2 is supplied from the video tape recorder section 10 to the audio amplifying portion 7 and thereby a reproduced sound is emanated from the loudspeaker 8.

The third and fourth fixed contacts 4c and 4d of the switching circuit 4 are connected to first and second external video input terminals 15 and 16, which are connected to external video apparatus, respectively. For example, the first external video input terminal 15 may be connected to an external video tape recorder (not shown) for a video tape cassette with ½-inch video tape, whereby a reproduced video output signal VD3 from this external video tape recorder is supplied through the first external video input terminal 15 to the fixed contact 4c. Whereas, the second external video input terminal 16 may be connected to a video disc player (not shown) and a reproduced video output signal VD4 from this video disc player is supplied through the second external input terminal 16 to the fixed contact 4d. With the thus connected circuit elements, when the movable contact 4e of the switching circuit 4 is connected to its third fixed contact 4c, the reproduced video output signal VD3 from the external video tape recorder is supplied to the video amplifying portion 5 and the reproduced video output signal VD3 is reproduced on the CRT 6. When the movable contact 4e of the switching circuit 4 is connected to its fourth fixed contact 4d, the reproduced video output signal VD4 from the video disc player is supplied to the video amplifying portion 5 and thereby the reproduced video output signal VD4 is reproduced on the CRT 6.

The switching circuit 4 is controlled by a control signal C1 derived from the system control portion 11. The system control portion 11 is adapted to control the respective circuits in the television receiver section g Of the television receiver 1 in response to operation commands designated by a remote control signal RMC or a key control signal KYC. The remote control signal RMC is generated from a remote commander 12 and transmitted through a light receiving portion 13 to the system control portion 11. The key control signal KYC is supplied to the system control portion 11 from a keyboard 14 mounted on the television receiver 1. Both the keyboard 14 and the remote commander 12 have a source switching key 14a and 12a, respectively, for causing the switching circuit 4 to operate, as described hereinafter. The system control portion 11 is adapted to supply a control signal C2 to a mode control portion 17 of the video tape recorder section 10 so as to control its respective drive control mechanisms 18a, 18b, . . . , to control the operation of this video tape recorder section 10. A status signal ST indicative of the operation state of the video tape recorder section 10 is supplied from its mode control portion 17 to the system control portion 11. Also, this system control portion 11 is provided with a memory (last condition memory) 11a, and this memory 11a can store the control state of the system control portion 11.

When supplied with the remote control signal RMC or the key control signal KYC resulting from operating the source switching key 12a of the remote commander 12 or 14a of the keyboard 14, the system control portion 11 controls the connection of the movable contact 4e of the switching circuit 4.

The switching operation in which the switching circuit 4 is switched by the system control portion 11 will be described with reference to the flow chart forming FIG. 2.

Figure 2:
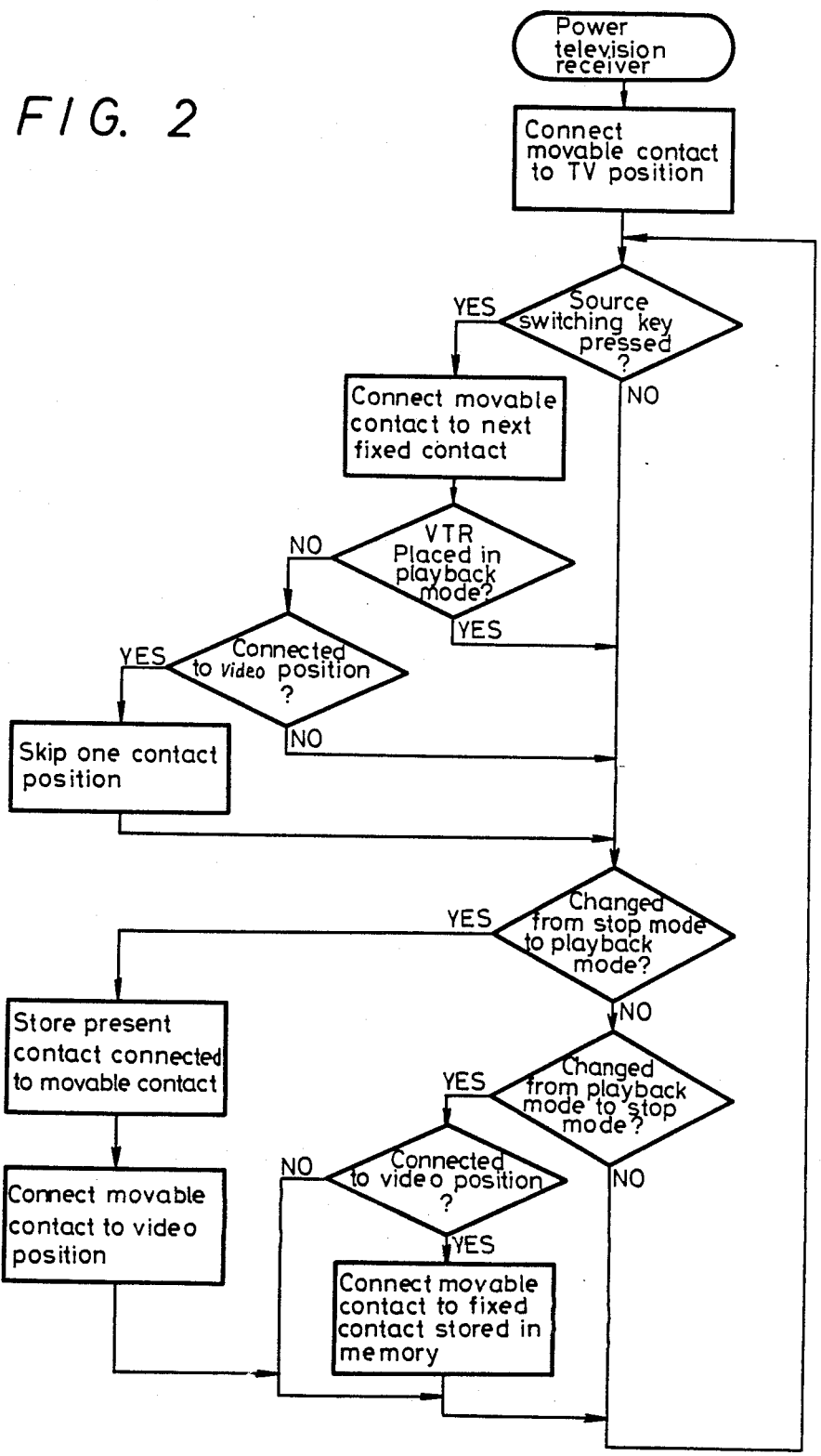
FIG. 2 is a flow chart used to explain the operation of the video source selecting system of the invention.

Referring to FIG. 2, when the television receiver 1 is powered on, the movable contact 4e of the switching circuit 4 is connected to its first fixed contact 4a regardless of the last condition of the television receiver 1 which is set just before being powered off, whereby the video detected output signal VD1 of the television broadcasting is supplied to the video amplifying portion 5. If the source switching key of the keyboard 14 is pressed, the movable contact 4e of the switching circuit 4 is changed in position. The switching operation is as follows. Each time the source switching key is pressed, the movable contact 4e is advanced one position to the next position. Therefore, when the movable contact 4e is connected to, for example, the first fixed contact 4a, it is advanced to the second fixed contact 4b; when the movable contact 4e is connected to, for example, the second fixed contact 4b, it is advanced to the third fixed contact 4c, etc. At that time, the system control portion 11 detects the status signal ST and judges whether the video tape recorder section 10 is placed in the playback mode or not. If the video tape recorder section 10 is placed in its playback mode, the movable contact 4e is made to be connectable to any of the first to fourth fixed contacts 4a to 4d of the switching circuit 4. If, on the other hand, the video tape recorder section 10 is not placed in its playback mode, the movable contact 4e is inhibited from being connected to the second fixed contact 4b of the switching circuit 4. In other words, if the input switching key is operated when the movable contact 4e is connected to the first fixed contact 4a and the video tape recorder section 10 is not placed in the playback mode, the movable contact 4e is connected to the third fixed contact 4c of the switching circuit 4. In this way, when the video tape recorder section 10 is not placed in its playback mode, the switching circuit 4 cannot connect its movable contact 4e to the position (second fixed contact 4b) corresponding to the video tape recorder section 10.

On the other hand, when the system control portion 11 detects that the video tape recorder section 10 is changed from its stop mode to the playback mode as indicted by a change, or by the status signal ST, without operating the source switching key, the movable contact 4e is automatically switched to the second fixed contact 4b, corresponding to the video tape recorder section 10, whereby the video output signal VD2 reproduced from the video tape is automatically reproduced on the CRT 6. At that time, the last condition data including an identification of the fixed contact that the movable contact 4e is connected before being switched to the second contact 4b is stored in the last condition memory 11a. Then, while still reproducing the reproduced video output signal VD2 from the video tape recorder section 10, if the user wants any other input video signal to be displayed, the movable contact 4e is successively connectable to any of the positions (all the fixed contacts 4a to 4d), by successively operating the source switching key.

If the video tape recorder section 10 is changed from the playback mode to the stop mode while the reproduced video output signal VD2 is being displayed, the connected state of the movable contact 4e is returned to the last condition or connected state before the video tape recorder section 10 was placed in its playback mode, which state is stored in the last condition memory 11a, or to the original position if the last condition memory has not been loaded.

As described above, since the system control portion 11 of the invention controls the operation of the switching circuit 4, in response to the operation mode of the built-in video tape recorder section 10, this television receiver becomes easy to operate. In other words, when the video tape recorder section 10 is placed in the playback mode, the movable contact 4e is automatically connected to the contact of the video tape recorder section 10 (second fixed contact 4b) without having to operate the input switching key. When the video tape recorder section 10 is changed from the playback mode to another operation, the movable contact 4e is automatically returned to the former or original position of the switching circuit 4. Accordingly, when the video output signal VD2 from the built-in video tape recorder section 10 is reproduced, the user is required only to select playback operation of the video tape recorder, but is not required to operate the input switching key, so this television receiver becomes easy to operate with only one control unit operated. On the other hand, when the video tape recorder section 10 is not placed in its playback mode, even though the input switching key is operated, the movable contact 4e is prevented from being connected to the contact of the video tape recorder section 10 terminal of the switching circuit 4, thus the unnecessary operation being inhibited.

As will be clear from the above description, it is needless to say that the audio signal switching circuit can be constructed the same as the video signal switching circuit of this embodiment to thereby switch the video and audio signals in relation to one another.

The switching circuit 4 maybe executed in a number of ways, as will be apparent to those skilled in the art from the above description. In one arrangement, the switching circuit may take the form of a ring counter, constructed of conventional gates, with the gates connected so as to enable the counter to assume successive states, in response to, reception of the next incrementing (or clock) pulse, which is produced in response to operation of the source switching key. An output signal corresponding to each state operates a gate for transferring one of the source video channels to the display unit for display on the CRT. A conventional power-on reset circuit is provided to reset the ring counter and the last condition memory to an initial state.

The gates which receive enabling signals when the ring counter is in its state preceding the state corresponding to selection of the playback video signal from the video tape recorder, also receive inputs in accordance with the mode of the VTR. If the VTR is in its playback mode, the gate causing the ring counter to assume its next successive position are enabled, and at the next clock pulse from source selecting switch, the reproduced signal from the VTR is made available to the display unit. Otherwise, another gate is enabled and, at the next operation of the source selecting switch, the ring counter assumes the next state, skipping the state corresponding to display of the VTR reproduced signal. An edge detector circuit responds to the leading edge of the status signal representing the playback mode of the VTR, and presets the ring counter immediately to the state corresponding to selection of the VTR reproduced signal for display, and causes the last condition memory to be set as described above. Another edge detector circuit responds to the trailing edge of the aforesaid status signal to set the ring counter in accordance with the contents of the last condition memory, if the ring counter is in the state corresponding to selection of the VTR signal.

FIG. 2 illustrates the steps which are carried out when the logical decisions required for control of the switching circuit 4 are carried out by software, for example, using a conventional microcomputer.

Further, while the television receiver 1 of the invention is provided with two external video input terminals 15 and 16, the number of the external video input terminals is not limited to two but can be increased or decreased freely.

Furthermore, according to the video source selecting system of this invention, since the switching of the switching circuit 4 is satisfactorily carried out in response to the built-in video tape recorder section 10, the television receiver having a built-in video tape recorder becomes easy to control and is more useful, because the steps required for its successful operation are fewer and are more easily learned by an operator, and there is less change for error in using the controls.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:
1. A video source selecting system comprising:
  (a) a switching means for sequentially selecting, for display, a monitor television receiver, video signals present on a plurality of channels, such video signals including a video signal from a built-in video tape recorder and a video signal from at least one external video input terminal; and
  (b) control means for controlling said switching means, said control means operative in response to said built-in video tape recorder placed in its playback mode, to cause said switching means to successively select each of said plurality of video signals sequentially, and operative in response to said built-in video tape recorder not placed in its playback mode, to omit the video signal from said video tape recorder from selection by said switching means.

2. A video source selecting system according to claim 1, wherein said built-in video tape recorder comprises an 8 mm video tape recorder.

3. A video source selecting system according to claim 1, further comprising a system controller for controlling operation of said built-in video tape recorder and said switching means.

4. A video source selecting system according to claim 3, wherein said system controller comprises a manually operated source selecting switch, and means responsive to operation of said source selecting switch for operating said switching means to successively connect said video signals on different ones of said channels to said monitor television receiver in response to successive operations of said manually operable source selecting switch.

5. A video source selecting system according to claim 4, wherein said system controller includes means operative in response to the operational state of said video tape recorder, for varying the order of selection of said video signals in response thereto.

6. A video source selecting system according to claim 5, wherein said system controller includes means operative in response to a change to the playback mode of said video tape recorder for immediately selecting the video signal from said video tape recorder.

7. A video source selecting system according to claim 3, further comprising a last condition memory connected to said system controller, and wherein said system controlled includes means for recognizing a change from the playback mode of said video tape recorder for causing said switching means to select a video signal in accordance with data stored in said last condition memory.

8. A video source selecting system according to claim 3, further comprising remote commander means for controlling said switching means by means of said system controller.

* * * * *